US009337602B2

(12) United States Patent
Huang

(10) Patent No.: US 9,337,602 B2
(45) Date of Patent: May 10, 2016

(54) CLAMP DEVICE FOR COAXIAL CONNECTOR

(71) Applicant: Chung-Chuan Huang, Tainan (TW)

(72) Inventor: Chung-Chuan Huang, Tainan (TW)

( * ) Notice: Subject to any disclaimer, the term of this patent is extended or adjusted under 35 U.S.C. 154(b) by 98 days.

(21) Appl. No.: 14/096,169

(22) Filed: Dec. 4, 2013

(65) Prior Publication Data

US 2015/0155672 A1 Jun. 4, 2015

(51) Int. Cl.

| | |
|---|---|
| ***B23P 19/00*** | (2006.01) |
| ***H01R 43/26*** | (2006.01) |
| *H01R 9/05* | (2006.01) |
| *H01R 103/00* | (2006.01) |

(52) U.S. Cl.

CPC *H01R 43/26* (2013.01); *H01R 9/05* (2013.01); *H01R 2103/00* (2013.01); *Y10T 29/53213* (2015.01)

(58) Field of Classification Search

CPC ...... H01R 9/16; H01R 43/00; H01R 43/0221; H01R 43/0263; H01R 43/042; H01R 43/048; H01R 43/26; Y10T 29/53065; Y10T 29/53174; Y10T 29/53217; Y10T 29/53222; Y10T 29/53257; Y10T 29/53283; Y10T 29/53909; Y10T 29/59343

USPC .............. 29/52, 55, 56.6, 270, 278, 715–718, 29/739, 749, 750, 758, 760, 764

See application file for complete search history.

(56) References Cited

U.S. PATENT DOCUMENTS

| | | | | |
|---|---|---|---|---|
| 3,895,214 | A * | 7/1975 | Winter | 219/230 |
| 4,386,461 | A * | 6/1983 | Plummer | 29/749 |
| 4,571,824 | A * | 2/1986 | Ingaglio | 29/764 |
| 4,821,610 | A * | 4/1989 | Redmon et al. | 81/322 |

* cited by examiner

*Primary Examiner* — Paul D Kim

(74) *Attorney, Agent, or Firm* — Rosenberg, Klein & Lee

(57) ABSTRACT

A clamp device for axial connector includes a clamp unit which has two clamp members connected to the first end thereof, and the two clamp members are located corresponding to each other. Each clamp member has a clamp portion and each clamp portion has a slot. The clamp unit has two arms pivotably connected to each other in a cross form. The clamp members clamp the axial connector and the protrusions on the axial connector are engaged with the slots of the clamp members.

8 Claims, 5 Drawing Sheets

CLAMP DEVICE FOR COAXIAL CONNECTOR

BACKGROUND OF THE INVENTION

1. Fields of the Invention

The present invention relates to a clamp device, and more particularly, to a clamp device for clamping a coaxial connector with protrusions.

2. Descriptions of Related Art

The conventional axial connector is used to be connected between electric or electronic products such as audio devices, wide-band networking devices, communication devices and television or broadcasting devices. These electronic devices or appliances are developed to be compact in size and light in weight, so that the reception holes for receiving the coaxial connectors become smaller than before. The inner diameter of the reception holes is slightly larger than the diameter of the coaxial connectors. Therefore, the level of difficulty of connecting or dis-connecting of the axial connectors is increased.

Taiwan Utility Model No. M450878 discloses a clamp device for an axial connector 10 which is shown in FIG. 1. The axial connector 10 has an outer casing 101 and two protrusions 102 extend outward from the outside of the outer casing 101. An annular portion 103 is formed on the outside of the coaxial connector 10 and the diameter of the annular portion 103 is larger than the outer casing 101 and the protrusions 102. The large annular portion 103 impedes the clamp device to engage the protrusions 102 with the slots of the clamp device, so that the conventional clamp device cannot be used to clamp the axial connector 10.

The present invention intends to provide a clamp device for clamping the axial connector and the clamp device improves the shortcomings mentioned above.

SUMMARY OF THE INVENTION

The present invention relates to a clamp device for axial connector and comprises a clamp unit which has two clamp members connected to the first end thereof. The two clamp members are located corresponding to each other. Each clamp member has a clamp portion and each clamp portion has a slot.

Preferably, each of the slots is an elongate slot.

Preferably, the two clamp members are two curved members.

Preferably, the first end of the clamp unit has two connection portions. Each clamp member has a passage in which the connection portion corresponding thereto extends.

Preferably, each of the clamp members has an extension extending perpendicularly therefrom. The passages are respectively defined in the extensions.

Preferably, each of the connection portions is welded to the passage corresponding thereto.

Preferably, each of the passage is a non-circular passage.

Preferably, the clamp unit has two arms which are pivotably connected to each other in a cross form by a pivot extending through two respective middle portions of the two arms. The two connection portions are connected to two respective first ends of the two arms respectively. Each of the arms has a handle connected to the second end thereof.

The clamp members and the extensions of the clamp unit of the present invention are not impeded by the annular portion of the convention axial connector so that the protrusions of the coaxial connector can be engaged with the slots in the clamp members. The clamp unit can easily clamp the axial connectors of different shapes so that the axial connector can be connected to or removed from the electronic devices or appliances.

The slots in the clamp members are elongate slots such that when rotating the clamp unit or the axial connector slightly, the protrusions of the coaxial connector are engaged with the slots in the clamp members.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
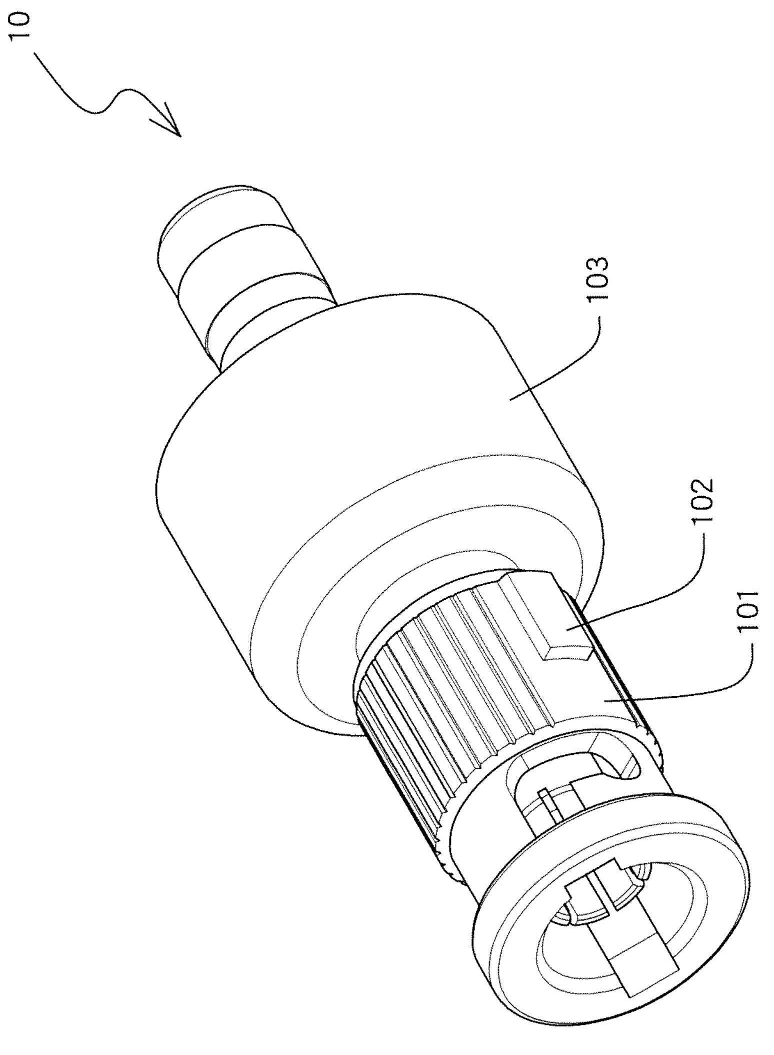
FIG.1(PRIOR ART)
FIG. 1 is a perspective view to show a coaxial connector.
Figure 2:
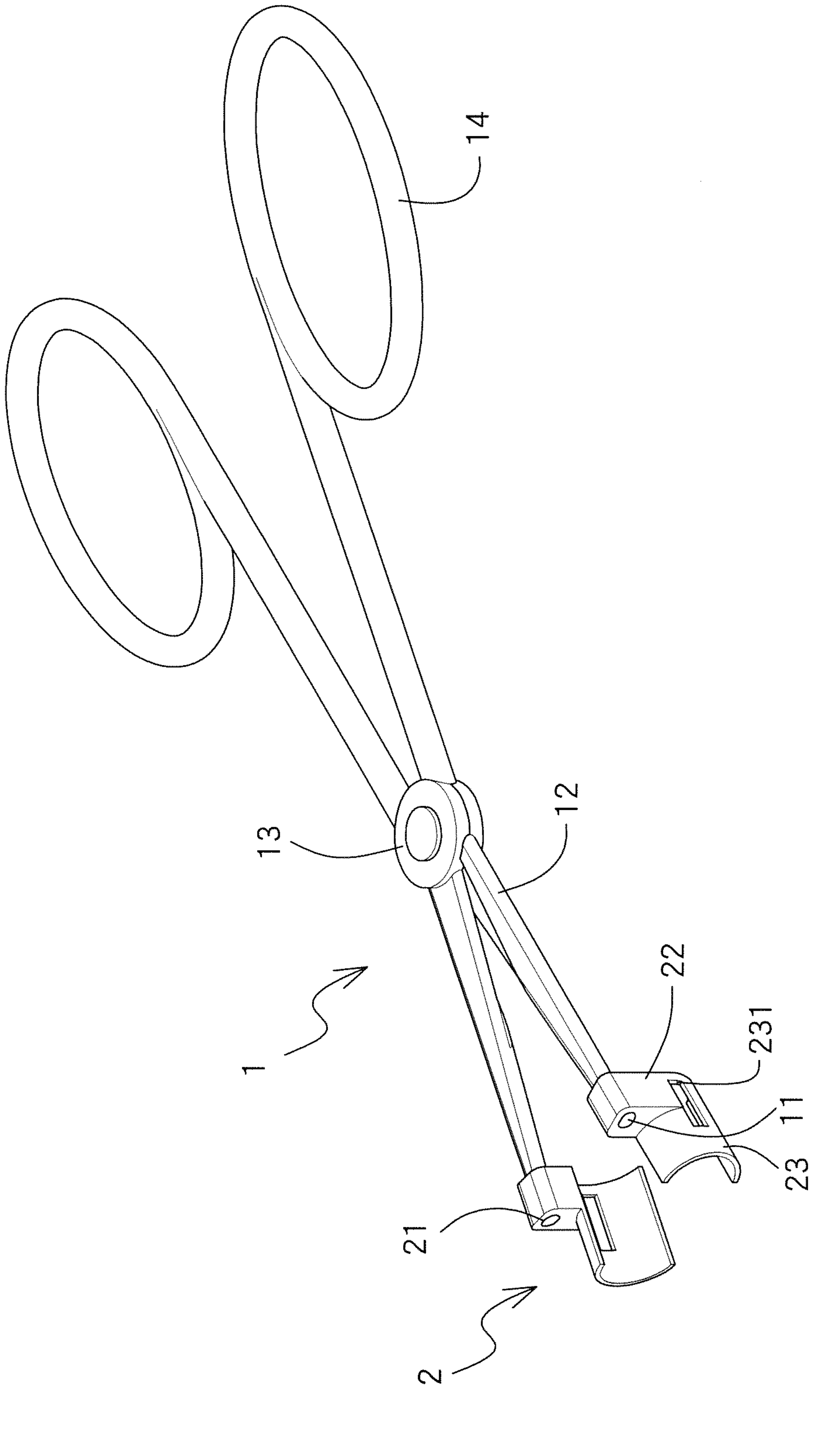
FIG. 2 is a perspective view to show the clamp device of the present invention.
Figure 3:
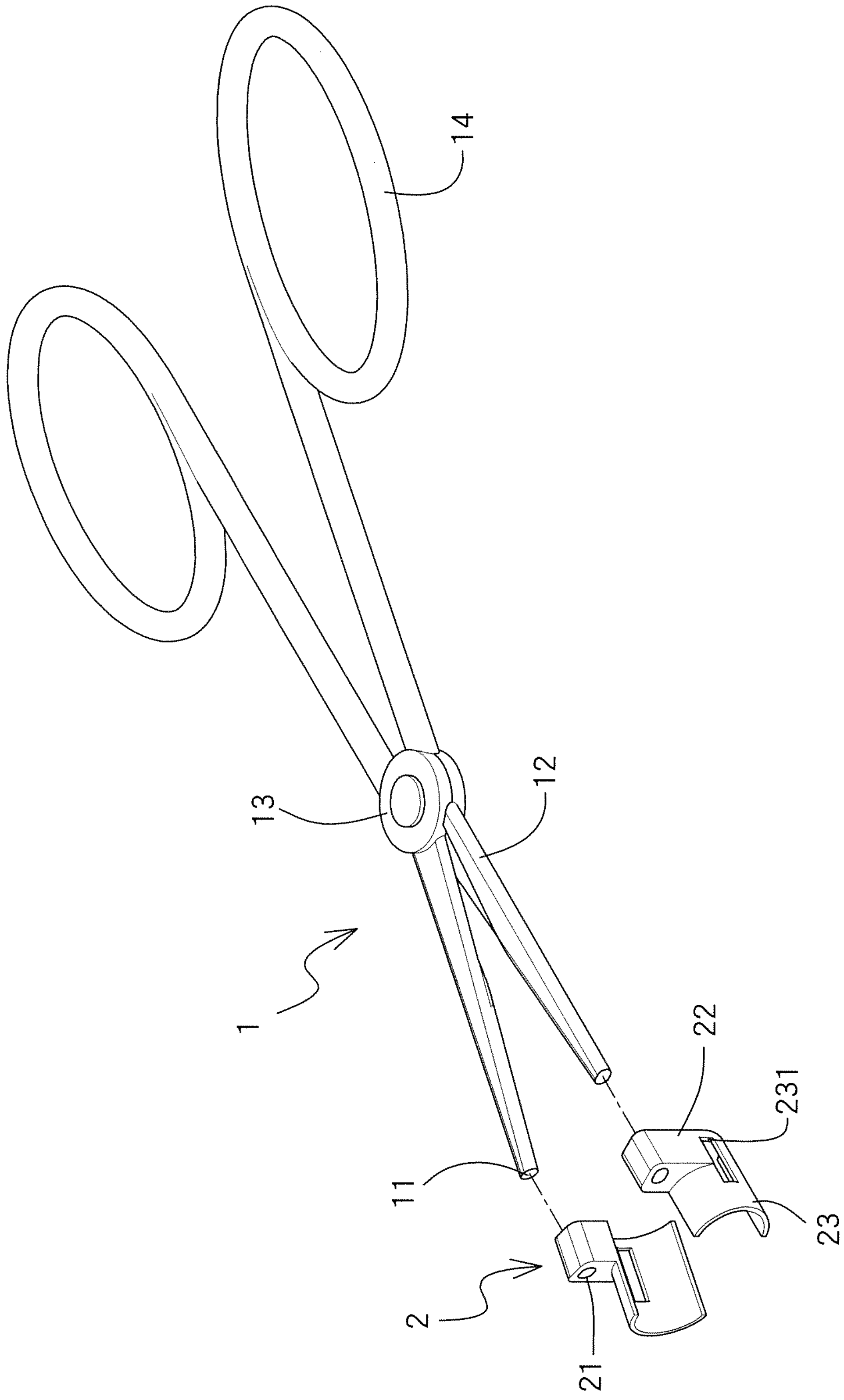
FIG. 3 is an exploded view of the clamp device of the present invention.

Referring to FIGS. 2 and 3, the clamp device of the present invention comprises a clamp unit 1 having two clamp members 2 connected to the first end thereof, and the two clamp members 23 are located corresponding to each other. The first end of the clamp unit 1 has two connection portions 11. Each clamp member 2 has a passage 21 in which the connection portion 11 corresponding thereto extends. In this embodiment, each of the connection portions 11 is welded to the passage 21 corresponding thereto. Each of the passage 21 is a non-circular passage so that the connection portion 11 does not loose from the passage 21.

The clamp unit 1 has two arms 12 which are pivotably connected to each other in a cross form by a pivot 13 extending through two respective middle portions of the two arms 12. The two connection portions 11 are connected to two respective first ends of the two arms 12 respectively, and each of the arms 12 has a handle 14 connected to the second end thereof.

Each of the clamp members 2 has an extension 22 extending perpendicularly therefrom. The passages 21 are respectively defined in the extensions 22. Each clamp member 2 has a clamp portion 23 and each clamp portion 23 has a slot 231. The two clamp members 23 are two curved members. Each of the slots 231 is an elongate slot.

Figure 4:
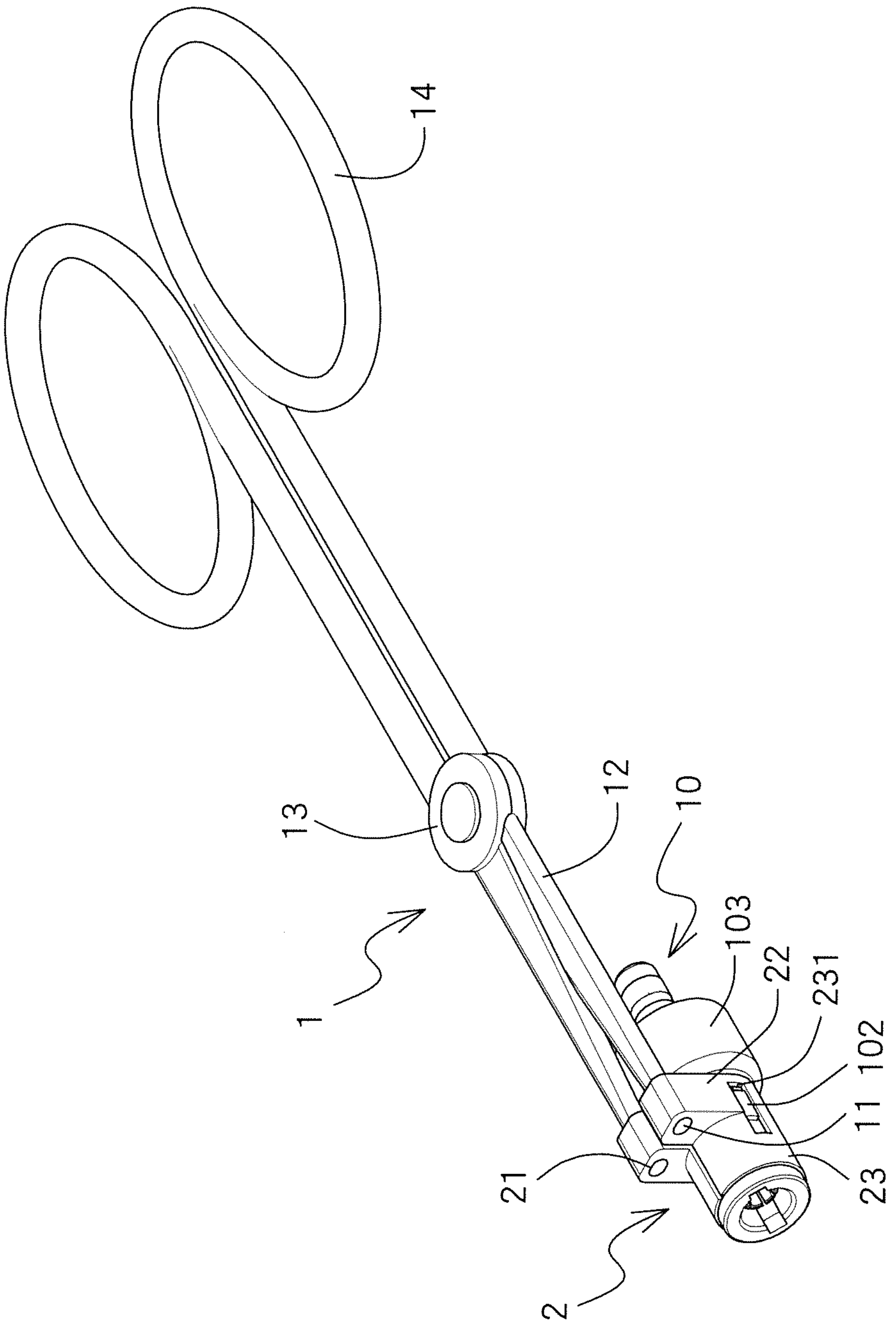
FIG. 4 shows that the clamp device of the present invention clamps the coaxial connector.

As shown in FIGS. 2 to 4, the axial connector 10 has an outer casing 101 and two protrusions 102 extend outward from the outside of the outer casing 101. An annular portion 103 is formed on the outside of the coaxial connector 10 and the diameter of the annular portion 103 is larger than the outer casing 101 and the protrusions 102. When using the clamp device of the present invention to clamp the axial connector 10, the user holds the handles 14 and opens the two arms 12 relative to the pivot 13 to clamp the outside of the axial connector 10 by the two clamp members 23.

Figure 5:
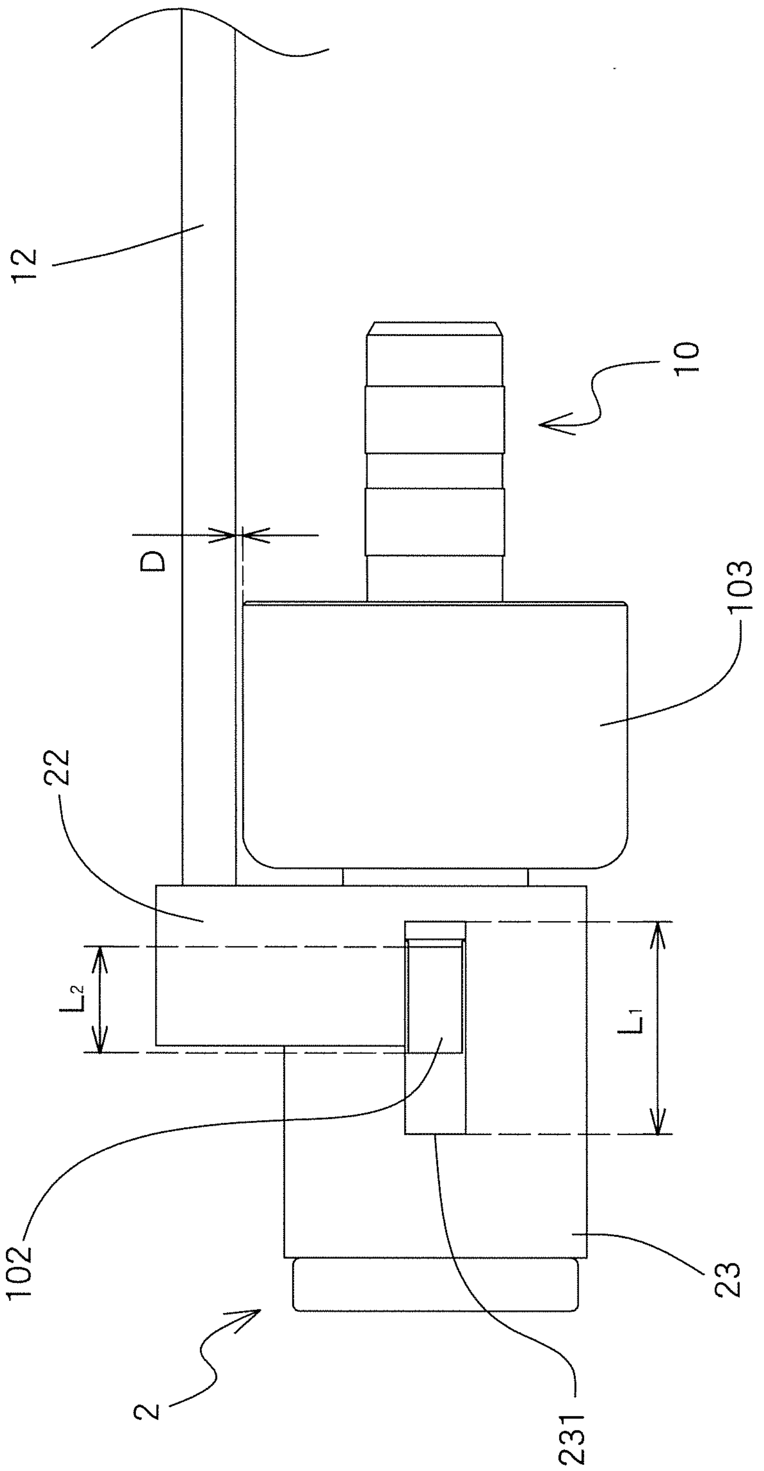
FIG. 5 is a side view illustrate that the clamp device of the present invention clamps the coaxial connector.

As shown in FIGS. 4 and 5, because each of the clamp members 2 has an extension 22 extending perpendicularly therefrom so that there is a distance between the clamp portion 23 and the arm 12. The distance allows the arms 12 not to be interfered with the annular portion 103 of the axial connector 10. A gap "D" is formed between the annular portion 103 and the arm 12. The slots 231 each have the length "L1", and the length protrusions 102 of the coaxial connector 10 is "L2". The length "L1" of the slot 231 is longer than the length "L2", so that when the clamp portions 23 clamp the coaxial connector 10, the user simply rotates the clamp unit 1 or the coaxial connector 10 slightly, without axially moving the clamp unit 1, the protrusions 102 are accommodated in the slots 231 and the coaxial connector 10 is rotated by operation of the clamp unit 1. By the clamp device of the present invention, the coaxial connector 10 is easily connected to or removed from the electronic device or appliance.

While we have shown and described the embodiment in accordance with the present invention, it should be clear to those skilled in the art that further embodiments may be made without departing from the scope of the present invention.

What is claimed is:

1. A clamp device for an axial connector, comprising:

a clamp unit and two clamp members connected to a first end of the clamp unit, the two clamp members located corresponding to each other, each clamp member having a clamp portion and each clamp portion having a slot;

wherein the first end of the clamp unit has two connection portions, each clamp member has a passage receiving the connection portion corresponding thereto;

wherein each of the connection portions is welded in the passage corresponding thereto.

2. The clamp device as claimed in claim 1, wherein each of the slots is an elongate slot.

3. The clamp device as claimed in claim 1, wherein the two clamp members are curved members.

4. The clamp device as claimed in claim 1, wherein each of the passages is a non-circular passage.

5. A clamp device for an axial connector, comprising:

a clamp unit and two clamp members connected to a first end of the clamp unit, the two clamp members located corresponding to each other, each clamp member having a clamp portion and each clamp portion having a slot;

wherein the first end of the clamp unit has two connection portions;

wherein an extension extends perpendicularly from each of the clamp portions, and each extension has a passage receiving the connection portion corresponding thereto;

wherein each of the connection portions is welded in the passage corresponding thereto.

6. The clamp device as claimed in claim 5, wherein each of the passages is a non-circular passage.

7. The clamp device as claimed in claim 5, wherein each of the slots is an elongate slot.

8. The clamp device as claimed in claim 5, wherein the two clamp members are curved members.

* * * * *